United States Patent [19]

Smith

[11] Patent Number: 4,583,691
[45] Date of Patent: Apr. 22, 1986

[54] SPRAY GUN AND SOLVENT CLEANING OF SAME

[75] Inventor: Gary L. Smith, Costa Mesa, Calif.

[73] Assignee: Freeman Chemical Corporation, Port Washington, Wis.

[21] Appl. No.: 590,798

[22] Filed: Mar. 19, 1984

[51] Int. Cl.$^4$ ............................................. B05B 15/02
[52] U.S. Cl. .................................. 239/112; 134/166 R
[58] Field of Search .............. 134/166 R, 169 R, 170; 239/112

[56] References Cited

U.S. PATENT DOCUMENTS

| | | |
|---|---|---|
| 286,880 | 10/1883 | Weaver ............................ 134/169 R |
| 2,226,870 | 12/1940 | McDevitt ............................ 134/170 |
| 2,475,407 | 1/1946 | Sell .................................... 134/166 R |
| 2,890,836 | 6/1959 | Gusmer et al. ..................... 239/117 |
| 3,263,928 | 8/1966 | Gusmer et al. ..................... 239/123 |
| 3,786,990 | 1/1974 | Hagfors ............................. 239/112 |
| 3,945,569 | 3/1976 | Sperry .............................. 239/112 |
| 4,325,513 | 4/1982 | Smith et al. ...................... 239/112 |

FOREIGN PATENT DOCUMENTS 64437 12/1913 Austria ............................ 134/166 R Primary Examiner—Joseph F. Peters, Jr.
Assistant Examiner—Scott D. Malpede

[57] ABSTRACT

A spray gun for dispensing plural component foam forming materials includes a mixing chamber having a plurality of entry ports for the individual components. A sliding rod is used to open and close the entry ports and a solvent tank is disclosed for cleaning the mixing chamber to prevent clogging of the gun. The tank includes a tube which fits within the mixing chamber to force solvent therethrough as the gun is inserted into the tank. Slots in the gun body may also be provided to insure further cleaning.

6 Claims, 4 Drawing Figures

SPRAY GUN AND SOLVENT CLEANING OF SAME

BACKGROUND OF THE INVENTION

1. Field of the Invention

The present invention relates generally to the field of spray guns for dispensing materials, and more particularly, to a spray gun for dispensing a plurality of reactive components and a solvent system for cleaning the gun of combined reactants. Still more specifically, the invention relates to a gun which may be efficiently solvent cleaned and yet which may readily be altered to provide air cleaning, if desired.

2. Description of the Prior Art

The application of plural component systems using a spray gun is well known. While a variety of such systems are known in the prior art, the present invention and the prior art relevent thereto can best be illustrated by reference to the application of polyurethane foams using such spray guns.

Polyurethane foams are typically prepared by reacting a first component comprising a polyol and a second component comprising a polyisocyanate. Other materials which are commonly employed in urethane foams, such as blowing agents, cell formers, etc. may be included in one or the other of the two major components. When mixed, the components react to form a foam useful for insulation, packaging, coatings and the like. The reaction takes place very quickly, in most cases within 10-20 seconds. The resulting foam may be rigid or flexible.

One major difficulty experienced in the prior art has been the cleaning of the guns used for foam application, due mainly to the fact that such guns typically include some type of mixing chamber for the plural components. Some guns attempt to overcome the problem by providing for the convergence of separate streams of components at a location in front of the tip of the gun, but these devices have not received widespread commercial acceptance due to the fact that intimate mixing is difficult to achieve. Other types of guns employ the more typical approaches of providing for compressed air or solvent flushing of the mixing chamber. Several examples will now be described so that the advantages of the present invention can be more fully appreciated.

One such system is described in commonly assigned U.S. Pat. No. 4,325,513, issued Apr. 20, 1982 to Robert L. Smith and Gary L. Smith and entitled "Gun for Dispensing a Plural Component System." In this patent, an air flush system is provided in connection with a gun having a forward static mixing chamber and inlet ports leading thereto for the supply of first and second components. Compressed air is connected to the gun and an air passage leads to the mixing chamber and is selectively coupled thereto by a valve member. The inlet ports are selectively closed by other valve members. A trigger mechanism on the gun is coupled to the respective valve members in such a way that when it is placed in a first position, compressed air is admitted to the mixing chamber to purge same. When the trigger is placed in a second position, the air purge is terminated and the components of the plural component system are discharged from the respective component feed ports, into the mixing chamber and out of the discharge outlet. In the preferred embodiment of this patent, the second trigger position is achieved only after the trigger has been pulled through the first position, and the gun is shut down only by going back through the first position, thus insuring that an air blast is always employed to purge the mixing chamber.

The gun described in the Smith et al. patent has become commercially accepted and has satisfied many of the problems which existed in the art prior to its introduction. However, the gun of that patent does have certain drawbacks. In some installations where this type of gun would be employed, compressed air may not be available or the noise resulting from a compressed air purge may not be acceptable. Moreover, for some spray applications, the mixed components may be so difficult to remove by an air purge that frequent downtime is required for gun cleaning. Furthermore, it may be desirable in some installations to have the alternate capabilities for air or solvent cleaning, a capability not found in prior art devices known to the present inventor.

Other prior art guns employ solvent cleaning by attaching solvent lines to the gun and various additional valve arrangements to permit solvent to flow through the mixing chamber after spraying of the plural components. Some of such guns also provide for solvent lubrication of moving parts within the gun to keep them from freezing following contact with mixed components.

Still other types of guns employ a clean out rod for the mixing chamber, an example of which is Gusmer et al. U.S. Pat. No. 2,890,836, issued June 16, 1959 for "Apparatus for Applying a Mixture of a Plurality of Liquids." In the gun described in this patent, the plural components are admitted tangentially to a cylindrical bore mixing chamber near the gun tip, and a cylindrical rod is controlled by a tigger mechanism to move back and forth through the mixing chamber. The rod serves the dual purposes of opening and closing the component inlets to the chamber as it is drawn away from the tip and of cleaning out the mixing chamber as the trigger is released and the rod moves to the front of the bore. In this patent, the rod has a conical tip with a sharp point so that the tip extends outside the mixing chamber to expel mixed components therefrom.

In subsequently issued U.S. Pat. No. 3,263,928, issued Aug. 2, 1966 for "Apparatus for Ejecting a Mixture of Liquids", Gusmer describes a similar gun in which an elastically deformable material forms a portion of the chamber wall. The bore formed by such portion has a diameter which is slightly less than the diameter of the cleaning plunger. The plunger expands the portion when in its forward position to insure cleaning contact. This patent further discloses an air cap at the front of the gun so that compressed air can be blown across the tip to remove mixed components therefrom. The plunger in this patent is controlled by compressed air mechanisms and a trigger valve.

More recent patents also disclose a rod or plunger cleaning process for such spray guns. For example, Hagfors in his U.S. Pat. No. 3,786,990, issued Jan. 22, 1974 for "Plural Component Gun" describes a plunger in which the front of the plunger is configured in a particular way to create different spray patterns. In this patent, another improvement is suggested, i.e. the addition of a lubricant for the rod supplied rearwardly of the plural component inlets. The lubricant may be gravity fed or may be fed under pressure from a reservoir in the gun. Hagfors also suggests the use of fluid jets near the tip to clean the front of the rod before the plural components have time to react on the rod.

A still further example of a plunger-type gun is shown in Sperry's U.S. Pat. No. 3,945,569, issued Mar. 23, 1976 for "Foam Dispensing Apparatus." A reciprocally mounted, air pressure controlled valve rod has a circular cross section at its forward end to pass through and clean the mixing chamber and to open and close the inlets for the plural foam forming components. However, the rod has a flattened portion between its ends and a reservoir of cleaning solvent is provided in the body of the gun through which the rod passes during rearward movement. The solvent cleanses the rod and allows it to move freely through the mixing chamber.

While these latter patents are embodied in various commercial spray gun devices, they suffer from certain problems, such as sticking of the valve rod. Also, air cannot be used for cleaning if that is desired in a particular spraying application. A spray gun which may be easily cleaned by solvent would represent a significant advance in the art, especially if the gun could readily be adapted for either solvent or air cleaning.

OBJECTS AND SUMMARY OF THE INVENTION

It is a primary object of the present invention to provide a gun for spraying plural foam forming components which overcomes the aforementioned disadvantages of the prior art.

Another object of the present invention is to provide a gun for spraying plural foam forming components which may be effectively cleaned of mixed components to prevent clogging thereof.

Yet another object of the invention is to provide a gun for spraying plural foam forming components which may be effectively cleaned by solvent without the need for providing a solvent supply system within the gun itself.

A different object of the present invention is to provide a gun for spraying plural foam forming components which may readily be adapted for air cleaning.

How these and other objects of the present invention are accomplished will be described in the following description of the preferred embodiment, taken in conjunction with the FIGURES. Generally, however, the objects are accomplished by combining a spray gun and a solvent cleaning tank. The gun uses a sliding rod to open and close inlets to permit the foam forming components to enter a cylindrical mixing chamber. The chamber includes a foward cylindrical portion which is open, even when the rod is in its forwardmost position. The tank includes a cleaning solvent and a hollow tube disposed upwardly from the bottom of the tank. When the gun is placed into the solvent containing tank, the tube passes into the cylindrical chamber and affects a cleaning thereof. Moreover, the gun may include slots in its front plate so that a solvent flush occurs when the gun is immersed in the tank. The slots serve to bathe a portion of the rod to increase the cleaning of that component and to facilitate smooth passage thereof along the bore of the mixing chamber. With respect to the modification of the commercially available gun, the one described in the aforementioned Smith et al. patent, that gun may be easily modified simply by replacing the front plate thereof (to provide the cleaning slots) and by removing the compressed air control rod thereof and replacing it with a plunger rod as will be more particularly described hereafter. The objects of the present invention may also be accomplished by other embodiments which will become apparent after those skilled in the art have read and understood the present specification, such other modifications being deemed to fall within the scope of this invention. Certain of such modifications will be described herein.

DESCRIPTION OF THE DRAWINGS

Like reference numbers will be used throughout the following description of the preferred embodiment to designate like components.

DESCRIPTION OF THE PREFERRED EMBODIMENT

Before proceeding to a description of the preferred embodiment, it should be mentioned that the disclosure of the aforementioned Smith et al. patent is expressly incorporated herein by this reference, because in many respects, the spray gun shown and described therein is identical to the present invention. Accordingly, the gun of the present invention will be described only generally except for the features which pertain to the present invention. Reference should be had to the aforementioned Smith et al. patent if a more detailed description is desired. It should also be mentioned at the outset that the principles of the present invention are also applicable to other types of spray guns having a forwardly located mixing bore in which plural foam forming components are mixed from separate inlets and from which the mixed components are discharged for a particular spraying application.

Figure 1:
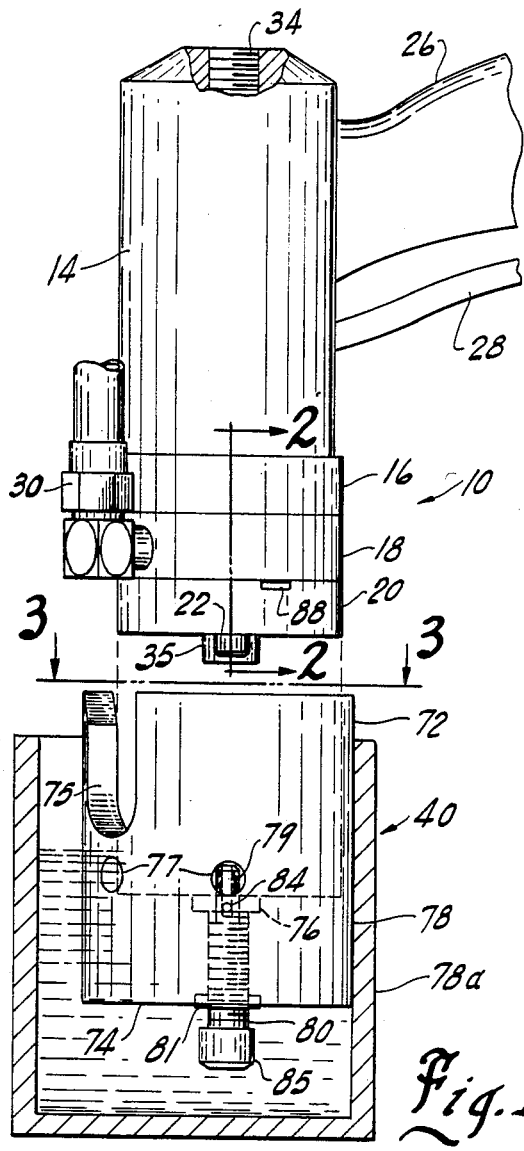
FIG. 1 is a side elevation view (with certain parts broken away) showing the spray gun and solvent tank according to the preferred embodiment of the present invention.

The spray gun 10 shown in FIG. 1 has a housing including a rear section 14, a rear midsection 16, a front midsection 18 and a front section 20. These sections are all coupled together with appropriate interlocking bolts and annuluses. For example, bolts 22 couple the front section 20 to the front midsection 18 and bolts 24 couple the front midsection 18 to the rear midsection 16.

Gun 10 also includes a pistol type handle 26 coupled to the bottom of rear section 14 and a trigger mechanism 28 which enters the interior of rear section 14 to operate the various valve and rod components which will be described later herein. Attached to the uppermost surface of front midsection 18 are the inlet nipples 30 and 32 for the pressurized foam forming components, while located in the rear end of rear section 14 is a port 34 for receiving a compressed gas inlet coupling (not shown). Gun 10 also includes an outlet nozzle 35 for the mixed foam forming components. In the illustrated embodiment, the outlet open is round and is centrally located in the front face of front section 20.

Figure 2:
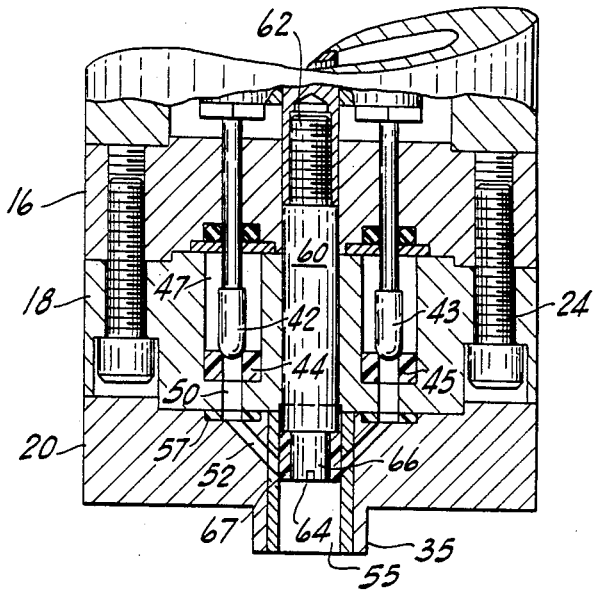
FIG. 2 is a cross-sectioned view taken along the line 2—2 of FIG. 1 and showing certain internal valve, plunger and coupling components of the present invention.

Before proceeding to the description of the solvent tank 40, reference will be made to some of the internal components of gun 10 by examination of FIG. 2. A pair of movable valve heads 42 and 43 are comparable to those of the Smith et al. patent and engage valve seats 44 and 45 respectively. The components admitted through nipples 30 and 32 enter the chambers 47 surrounding the valve heads 42 and 43 and upon movement of trigger 28 toward handle 26, the components are allowed to flow toward the outlet nozzle 35. The various seals and trigger coupling mechanisms are not described because they are shown in the Smith et al. patent.

The components pass through the two valve seats 44 and 45 and into a pair of channels 50 in the front midsection 18 and then through a further pair of slanted channels 52 in front section 20 which are inclined at an angle of approximately 45° to cylindrical mixing chamber 55 extending from the back of front portion 20 through the outlet nozzle 35. The FIGURES show a separate metal tube forming the mixing chamber 55, but the chamber could also be an integral part of the front section 20. Seals 57 may be provided between the front section 20 and the front midsection 18 to prevent leakage of the plural components.

The system for preventing clogging of chamber 55 will now be described. The system includes an elongate plunger rod 60 having an inner threaded end 62 and an outer sealing end 64. End 62 is coupled to the internal trigger components (not shown) so that rod 60 may be retracted toward the rear of the gun when the trigger is pulled. The coupling is identical to that used for the elongate air cleaning member used in the Smith et al. gun. The outer end 64 preferably includes a restricted cylindrical tip 66 covered with a sleeve 67 of sealing material, such as Teflon. End 64 of rod 60 terminates inwardly of the front end of outlet nozzle 35.

In its normal position, i.e. with the trigger in its released position, rod 60 is located so that the sealing sleeve is adjacent the openings of the plural component outlet channels 52 and prevents the flow of material therefrom. When the trigger is retracted, the rod is pulled rearwardly to open the outlet channels 52 to chamber 55. When spraying is discontinued, the sealing sleeve 67 slides forwardly to close the outlets. At this time, mixed components will reside in chamber 55 which must be promptly removed to prevent clogging of gun 10.

Figure 3:
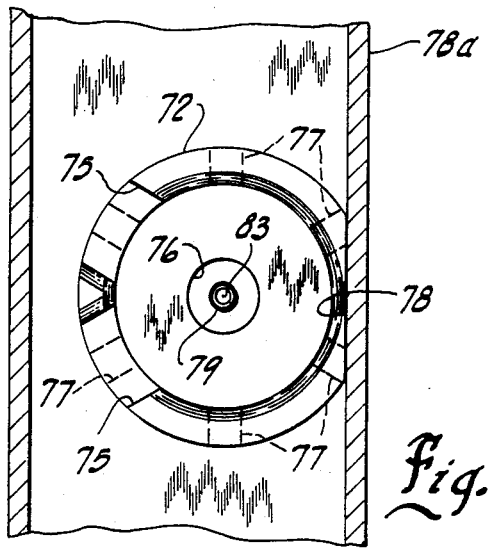
FIG. 3 is a top view of the solvent tank and reservoir taken along the line 3—3 of FIG. 1.
Figure 4:
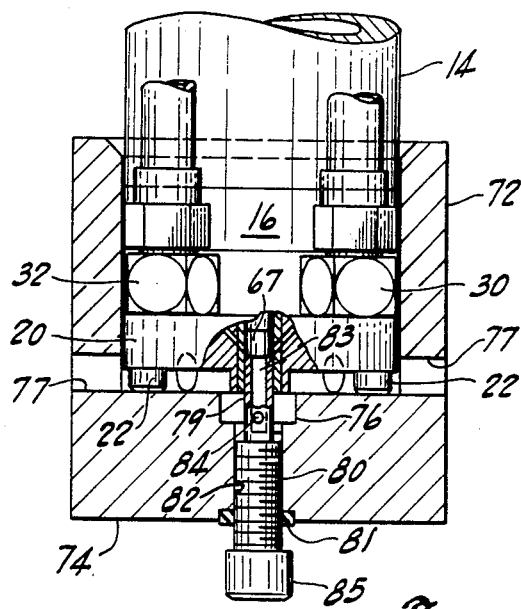
FIG. 4 is a side perspective view of the gun inserted into the solvent tank, with parts broken away to show the solvent cleaning tube inserted into the mixing chamber of the gun.

The system of the present invention to clean chamber 55 also includes a solvent tank 40 shown in FIGS. 1, 3 and 4. Tank 40 includes a generally cylindrical wall 72 and a bottom 74 adapted to receive the front end of gun 10. Wall 72 includes a pair of cut-outs 75 so that nipples 30 and 32 will not prevent gun 10 from being inserted into tank 40. The cut-outs should be arranged so that the front section 20 of gun 10 will be located below the bottom of the cut-outs when the gun is fully inserted in tank 40. Bottom 74 has a circular recess 76 at its middle which has a diameter slightly larger than the diameter of outlet nozzle 35.

Tank 40 also includes a plurality of holes 77 in wall 72 and located in a plane below the level of the cut-outs 75 so that solvent may be admitted to the interior of tank 40 from a surrounding container 78A. Tank 40 may have a flattened section 78 of wall 72, if desired, so that the tank may be attached to the container. Many container configurations could be employed including small portable containers or larger stationary containers. The container 78A is not critical to the invention. It merely serves as the reservoir for a larger quantity of solvent, so that frequent changes of solvent need not be made. By way of example only, Cellosolse solvent may be used in the present invention, as could any other known solvent for the particular chemicals used as the foam forming components.

The final component of tank 40 is a hollow tube 79 which is perpendicularly attached to the bottom 74 at the center of recess 76. In the illustrated embodiment, tube 79 is attached to tank 40 by a threaded solid rod 80 coaxially attached to the lower end of tube 79. Rod 80 is adapted to be screwed into a threaded opening 82 in tank 40. A suitable O-ring seal 81 is provided to prevent leaks. Nob 85 is located at the exterior end of rod 80 to facilitate insertion and removal of tube 79. The tube 79 should be high enough that it touches end 64 of rod 60 when the gun is fully inserted into tank 40. Tube 79 has an outside diameter just slightly smaller than the inside diameter of mixing chamber 55 and the central opening 83 of tube 79 extends along its length. A hole 84 is formed through tube 79 at its bottom for a purpose which will soon become apparent. The hole 84 lies just above the floor of recess 76.

The cleaning tank 40 and gun 10 cooperate in the following manner to affect cleaning of mixing chamber 55. As the gun 10 is inserted into the tank, nozzle 35 will slide over the tube 79 which is immersed in solvent. As the tube 79 is forced into chamber 55, solvent will be forced through the small space between tube 79 and chamber 55 and solvent will also be forced down tube 79 and out hole 84. The action is one which causes the solvent to flow under pressure and at accelerated speeds, resulting in a very efficient cleaning of the tip of end 64 of rod 60 as well as the mixing chamber 55.

While not essential to the present invention, a modification which also assists in gun cleaning is shown in FIG. 1, i.e. the provision of four slots 88 in the rear surface of front section 20 of gun 10. Slots 88 extend from the periphery of that section toward the center thereof. Slots 88 are shown as rectangular slots (when combined with the front face of front midsection 18), but any shape may be employed. Solvent will flow through the slots and bathe the side of the Teflon sleeve and a small portion of rod 60 itself when it is in its extended position, thereby lubricating same and insuring freedom from contamination by mixed foam forming ingredients. The number of slots 88 may also be varied over a wide range.

The solvent cleaning system of the present invention may readily be incorporated into the aforementioned Smith et al. gun. The first step is replacement of the front section of the Smith et al. gun by the above-described front section 20. The second step is the substitution of rod 60 for the air injection tube of the Smith et al. gun. Both rods are threaded, so this replacement step is extremely simple. The versatility provided by the present invention will be readily apparent to those skilled in the art, i.e. solvent or air cleaning. Furthermore, the tank cleaning system can be used with many other types of guns which have a tubular mixing chamber which needs to be periodically cleaned of mixed foam forming components. Furthermore, the system of the present invention may be readily adapted to a wide variety of air assist and manual trigger configurations, gun shapes, chemical mixtures, etc. So while the invention has been described in connection with a particular embodiment, it is not to be limited thereby but is to be limited solely by the claims which follow.

I claim:

1. In combination, a gun for dispensing a plural component reactive chemical system, said gun having a body and a spray tip with an opening at the forward portion thereof, a mixing bore within said gun and communicating with a spray tip, means within said gun for selectively admitting said plural components under pressure to said bore whereby said components are mixed within said bore and are discharged from said spray tip, a solvent tank containing a solvent for the mixed reactive components and being constructed to receive at least the forward portion of said gun when said forward portion is inserted into said tank, said tank including a side wall, a bottom and a tube means perpendicularly attached to said bottom, said tube means having a diameter less than that of said spray tip and said bore whereby said tube means is inserted into said tank, said tube means being hollow and including a hole through the side wall thereof generally adjacent the bottom of said tank, wherein said means for admitting said components comprises a rod means in said gun and reciprocably movable within said bore and channel means for each of said components opening to said bore, said rod means closing said opening when it is in a first forward position and being displaced therefrom when said rod means is in a second retracted position, said tube means extending into said bore and abutting said means in its first position when said gun is inserted into said tank.

2. The invention set forth in claim 1 wherein an annular recess is formed around said tube means in said bottom of said tank.

3. The invention set forth in claim 1 wherein said tube means is selectively removable from said tank and wherein said tube means has a threaded solid portion on the bottom thereof, said tank having a threaded opening in said bottom for receiving said threaded portion of said tube means.

4. The invention set forth in claim 1 wherein said combination further includes a solvent container for said tank and surrounding at least a portion thereof, said tank having holes through said side wall to admit solvent thereto from said container.

5. The invention set forth in claim 1 wherein said rod means is removably mounted in said gun.

6. The invention set forth in claim 1 wherein said gun further includes a plurality of hollow slot means in said body and extending radially from the exterior thereof toward said rod means when said rod means is in its first forward position, whereby further cleaning of said gun is accomplished when said gun is inserted in said tank.

* * * * *